(12) United States Patent
Sechrist et al.

(10) Patent No.: US 11,630,006 B1
(45) Date of Patent: Apr. 18, 2023

(54) VEHICLE SURFACE FORCE SENSOR

(71) Applicant: The United States of America, as represented by the Secretary of the Navy, Arlington, VA (US)

(72) Inventors: Zachary A. Sechrist, Ridgecrest, CA (US); Ronald J. Tonucci, Waldorf, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 498 days.

(21) Appl. No.: 16/828,076

(22) Filed: Mar. 24, 2020

(51) Int. Cl.
*G01L 1/14* (2006.01)
*B60R 11/00* (2006.01)

(52) U.S. Cl.
CPC .............. *G01L 1/146* (2013.01); *B60R 11/00* (2013.01); *G01L 1/148* (2013.01); *B60R 2011/004* (2013.01); *B60R 2011/0063* (2013.01)

(58) Field of Classification Search
CPC ......... G01L 1/146; G01L 1/148; B60R 11/00; B60R 2011/004; B60R 2011/0063; H01L 27/02; H01L 27/016; H01L 28/90; H01L 28/82; H01L 27/22; H01L 23/5223; H01L 25/0657; H01L 23/5383; H01L 23/49822; H01L 25/162; H01L 21/84; G01P 15/0802; H01G 2/065; G01D 5/142; G01R 33/07

See application file for complete search history.

(56) References Cited

U.S. PATENT DOCUMENTS

| | | | |
|---|---|---|---|
| 6,999,857 B1 * | 2/2006 | Kasper | H04B 17/327 701/1 |
| 2008/0036453 A1 * | 2/2008 | Taylor | G01D 5/142 324/207.2 |
| 2015/0042522 A1 * | 2/2015 | Laifenfeld | H01Q 1/32 343/713 |

* cited by examiner

*Primary Examiner* — Brandi N Hopkins
(74) *Attorney, Agent, or Firm* — Naval Air Warfare Center Weapons Division; James M. Saunders

(57) ABSTRACT

Embodiments are directed to sensors that detect objects attached to a vehicle. The sensor includes a layered capacitive structure. The sensors utilize a deformable dielectric layer sandwiched between two conductive layers. The layered capacitive structure measures capacitance changes caused by an applied force to the uppermost layer of the capacitive structure.

20 Claims, 4 Drawing Sheets

VEHICLE SURFACE FORCE SENSOR

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

Embodiments generally relate to vehicle sensors.

Figure 1:
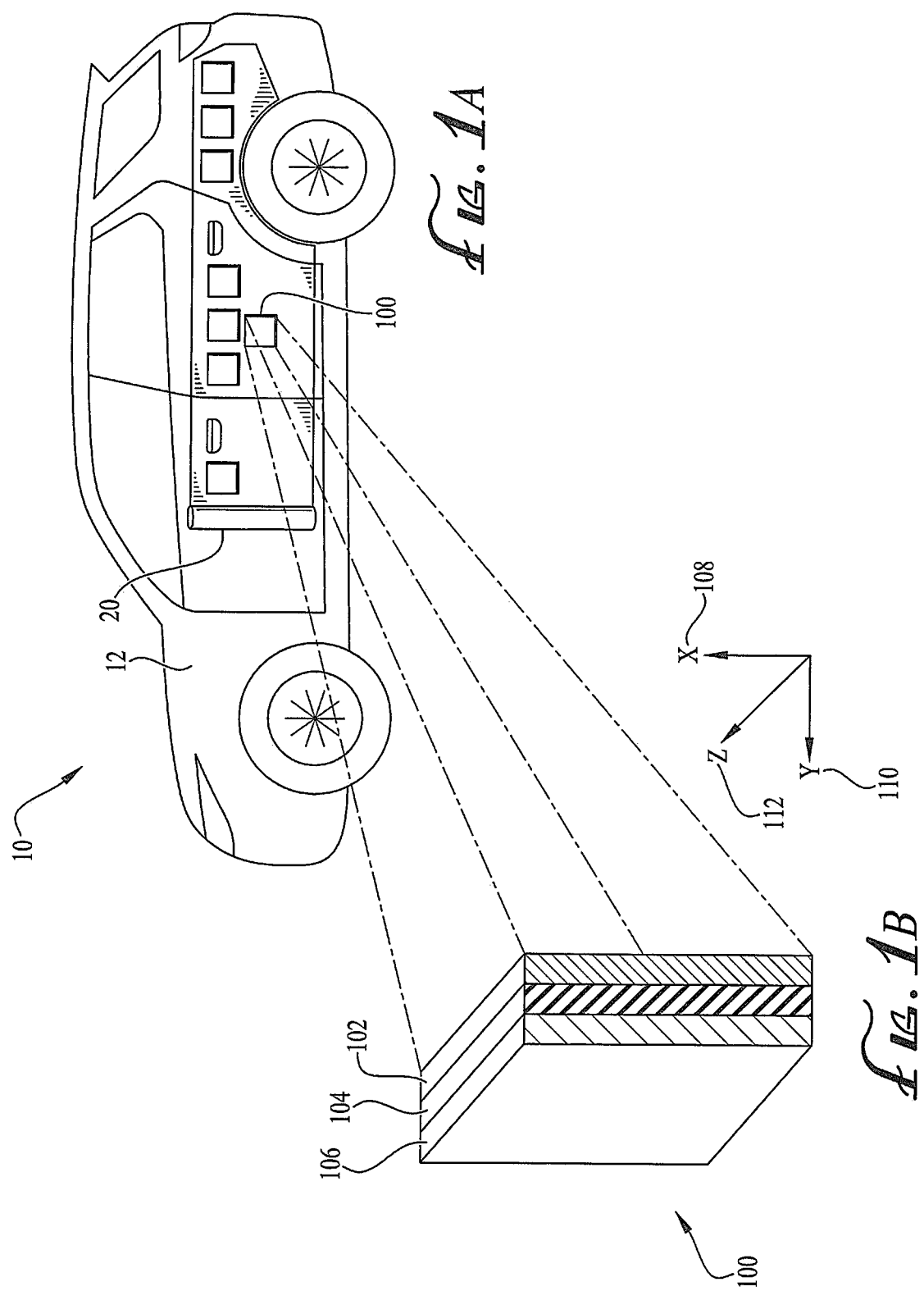
FIG. 1A illustrates an exemplary operating environment of a vehicle surface force sensor applied as a thin film device onto a vehicle's outer surface, according to some embodiments.
FIG. 1B illustrates an exploded three-dimensional cutaway section perspective of a portion of the vehicle surface force sensor shown in FIG. 1A.

It, is to be understood that the foregoing general description and the following detailed description are exemplary and explanatory only and are not to be viewed as being restrictive, as claimed. Further advantages will be apparent after a review of the following detailed description of the disclosed embodiments, which are illustrated schematically in the accompanying drawings and in the appended claims.

DETAILED DESCRIPTION OF EMBODIMENTS

Embodiments may be understood more readily by reference in the following detailed description taking in connection with the accompanying figures and examples. It is understood that embodiments are not limited to the specific devices, methods, conditions or parameters described and/or shown herein, and that the terminology used herein is for the purpose of describing particular embodiments by way of example only and is not intended to be limiting of the claimed embodiments. Also, as used in the specification and appended claims, the singular forms "a," "an," and "the" include the plural.

Embodiments generally relate to a device that senses when objects are attached to a vehicle's surface, especially when attached using magnets, tape, or adhesive. The embodiments are configured to create an awareness, i.e. an alert to vehicle users or other monitoring equipment users that an attachment has been made. This is accomplished by applying an external sensor wrapper, sometimes referred to as a thin film stack, onto the vehicle. In one embodiment, the sensor measures the capacitance between a transparent conductor applique and the sheet metal of the vehicle body separated by car paint and/or clear coat and adhesive. The device senses contact on the vehicle surface that does not result in attachment, such as, for example, pushing on the vehicle's surface by hand. A person having ordinary skill in the art will recognize that an applique is a substantially-flat, engineered structure.

Although the embodiments are described in considerable detail, including references to certain versions thereof, other versions are possible. Examples of other versions include varying component orientation or hosting embodiments on different platforms. Therefore, the spirit and scope of the appended claims should not be limited to the description of versions included herein.

Apparatus, System, and Method Embodiments—FIGS. 1A Through 3

In the accompanying drawings, like reference numbers indicate like elements. For all embodiments and figures, it is understood that the figures are not to scale and are depicted for ease of viewing. Reference characters 10, 100, 100A, 100B, and 400 depict various embodiments, sometimes referred to as mechanisms, apparatus, devices, systems, and similar terminology. Several views are presented to depict some, though not all, of the possible orientations of the embodiments. Some figures depict section views. Section hatching patterning is for illustrative purposes only to aid in viewing and should not be construed as being limiting or directed to a particular material or materials.

FIG. 1A depicts an exemplary operating environment associated with the embodiments. As shown in FIG. 1A, the operating environment is a motorized vehicle 10, sometimes referred to as a passenger vehicle. The vehicle 10 displayed can be referred to as a car, truck, sport utility vehicle (SUV), bus, motorcycle, and the like. The technology is not limited to land-based motorized vehicles, and can be used on manned and unmanned vehicles that operate in aerial, surface, and underwater environments. The particular vehicle 10 shown in FIG. 1A is an SUV and is not replicative of any particular brand or model SUV, but is shown for illustrative purposes only.

The vehicle 10 has an outer surface 12 or skin formed by body panels, sometimes referred to as sheet metal body panels and similar variations. Unless stated otherwise by example, the outer surface 12 of the vehicle 10 is understood to also include the vehicle's paint or protective coating. FIG. 1B is an exploded view showing a section of a portion taken from the outer surface 12 in FIG. 1A. Reference character 100 depicts an apparatus, device, or, in particular, a capacitive element or capacitive structure, according to the embodiments.

Figure 2:
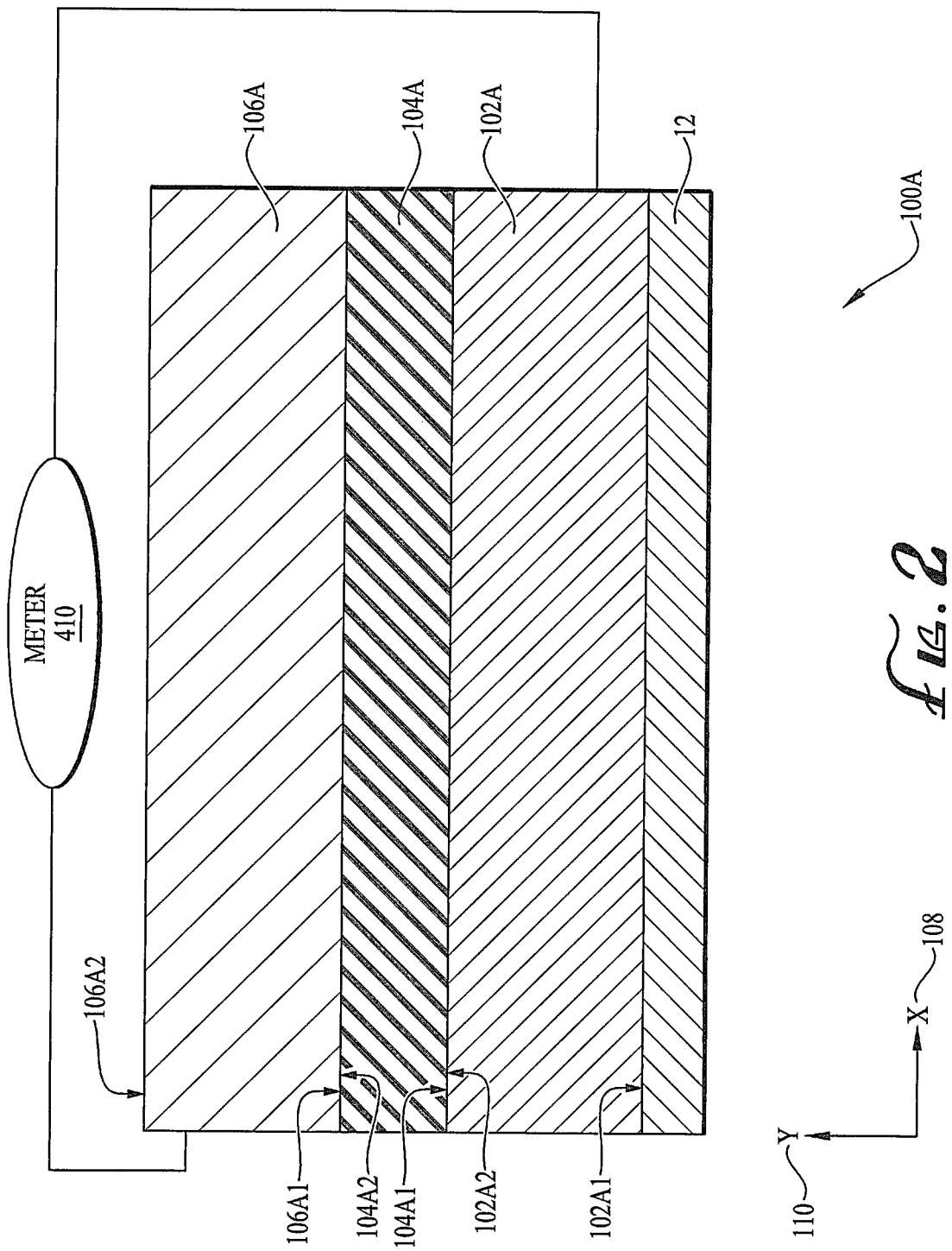
FIG. 2 illustrates a two-dimensional section view of a single vehicle surface force sensor applied as a three-layer stack to a vehicle's outer surface, according to some embodiments.
Figure 3:
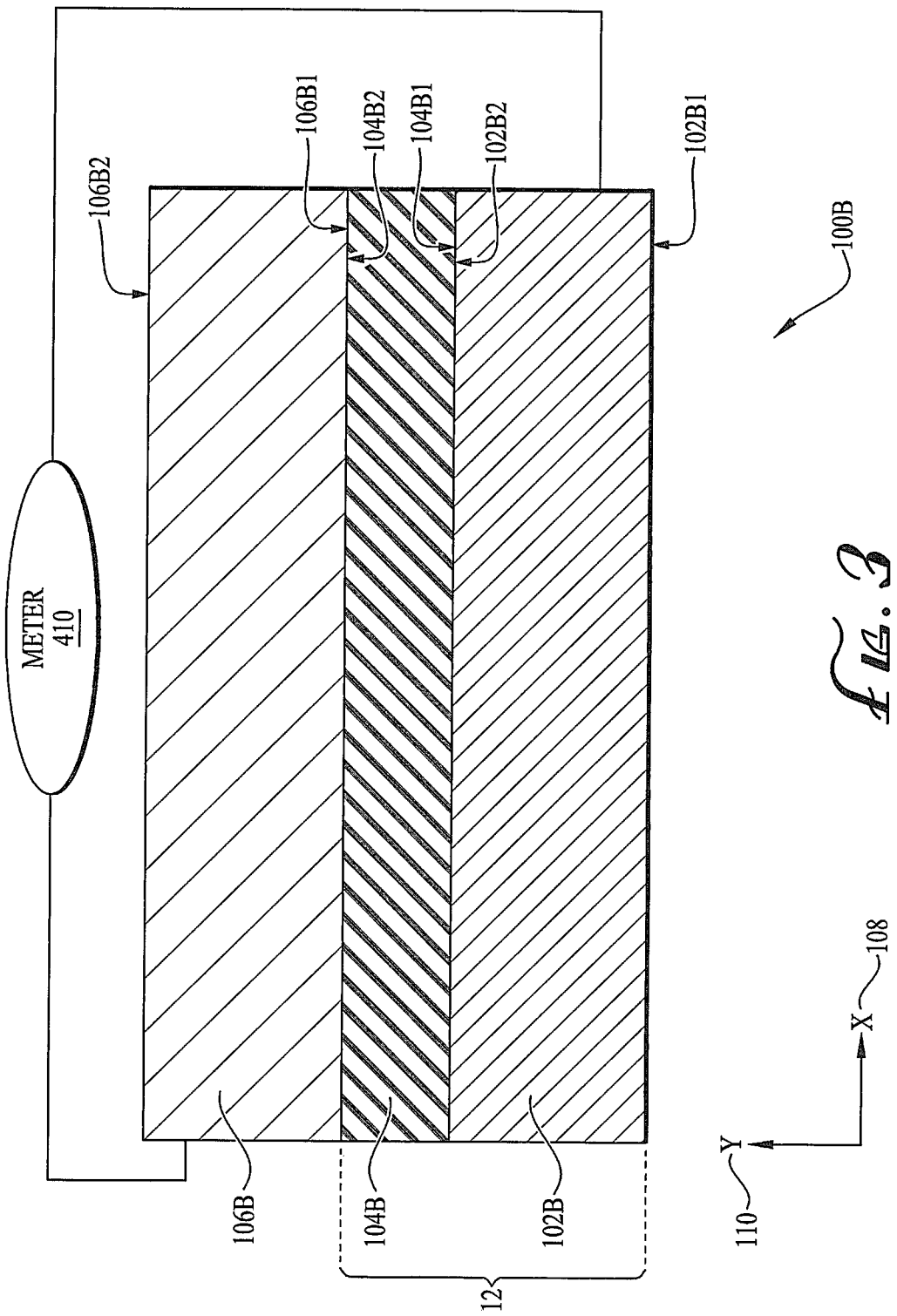
FIG. 3 illustrates a two-dimensional section view of a single vehicle surface force sensor applied as a one-layer stack to a vehicle's outer surface, according to some embodiments.
Figure 4:
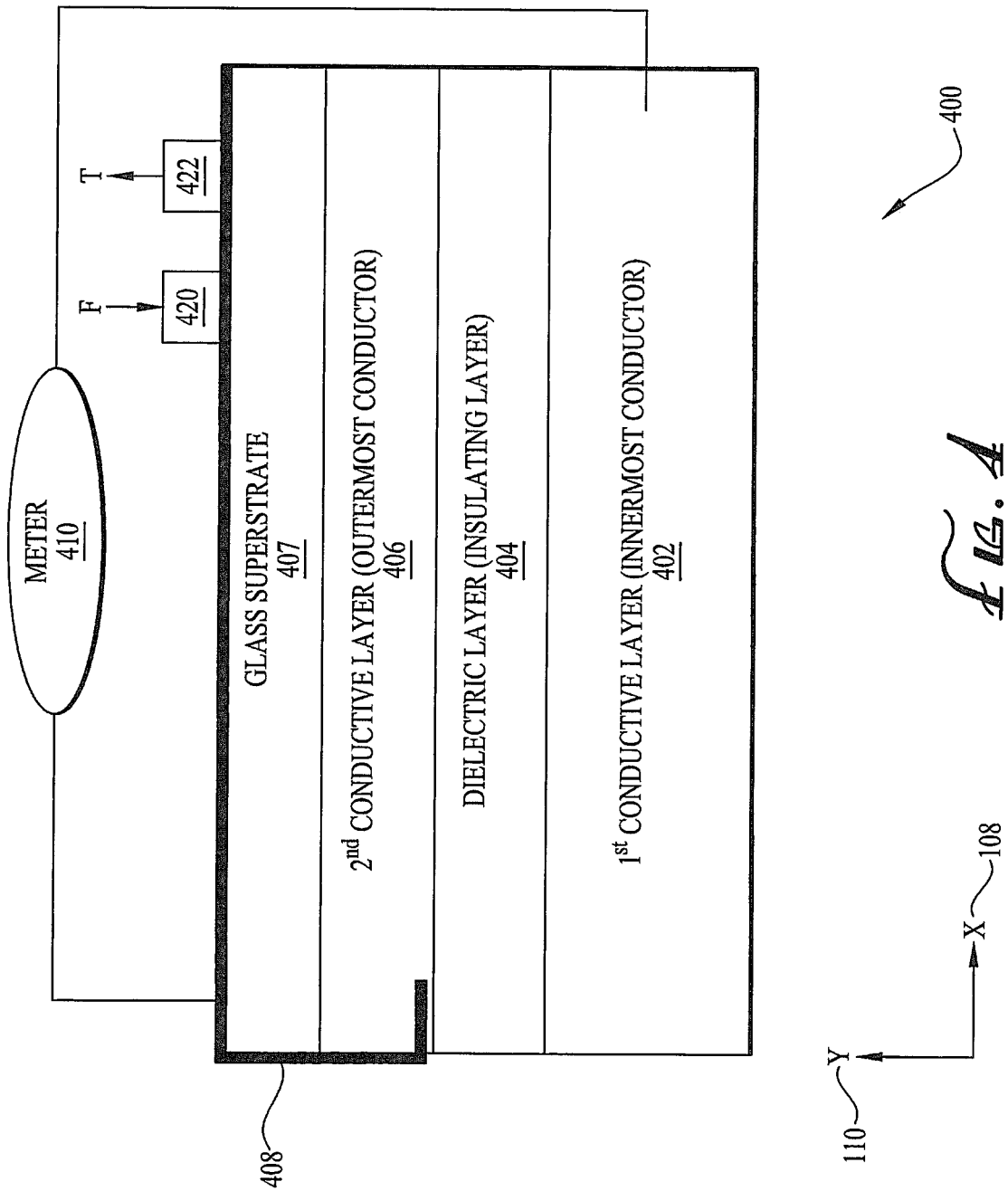
FIG. 4 illustrates a side view of a working laboratory-testing environment of a capacitive structure, according to some embodiments.

The capacitive structure 100 is applied to the outer surface 12 of the vehicle 10. The capacitive structure 100 is generically defined by a three-layer stack having a first conductive layer 102, a dielectric layer 104, and a second conductive layer 106. The dielectric layer 104 can also be referred to as a dielectric gap. A three-dimensional coordinate frame of reference defined by an x, y, and z-axis (108, 110, and 112, respectively) is included for reference in FIG. 1B. FIGS. 2, 3, and 4 are depicted in a two-dimensional plane having the x and y-axis (108 and 110, respectively).

In another embodiment, a system for a vehicle 10 having an outer surface 12 is disclosed. FIGS. 1A, 1B, and 2 depict the system as having a plurality of capacitive structures 100 applied to the outer surface 12 of the vehicle 10. The plurality of capacitive structures 100 are applied as a thin film sheet or device, which is also sometimes referred to as a flexible, transparent thin film. The application of the flexible, transparent thin film (i.e. the plurality of capacitive structures 100 applied to and distributed over the outer surface 12 of the vehicle 10) forms a sensor array, sometimes referred to as a grid. The plurality of capacitive structures 100 in FIG. 1A is shown for illustrative purposes and should not be construed as being an exact depiction of capacitive structures layout. The application is generically depicted in FIG. 1 by reference character 20.

FIG. 2 depicts a section view, shown in an x-y (108/110) plane, of a single capacitive structure 100A applied as a three layer stack to the vehicle's outer surface 12. This embodiment can be used for both a metallic vehicular body as well as one that is not metallic, i.e. non-metallic. The application of the capacitive structure 100A as a three layer stack is one embodiment and its respective layers have the letter "A" added to them. Hence, the capacitive structure 100A has a first conductive layer 102A having a first side 102A1 and a second side 102A2. A dielectric layer 104A also has a first side 104A1 and a second side 104A2. Finally, a second conductive layer 106A also has a first side 106A1 and a second side 106A2.

The first side 104A1 of the dielectric layer 104A is bonded to the second side 102A2 of the first conductive layer 102A. The first side 106A1 of the second conductive layer 106A is bonded to the second side 104A2 of the dielectric layer 104A. The first side 102A1 of the first conductive layer 102A is adhered to the motor vehicle outer surface. A flexible, deformable adhesive (not shown for ease of viewing) is used for layer bonding.

Yet another embodiment is shown in FIG. 3 and is applicable to apparatuses as well as systems and methods. The embodiment depicts a section view in an x-y (108/110) plane of a one-layer application to vehicle auto body panels and is applicable to a vehicle having metallic sheet metal, aluminum, and similarly conductive body panels.

Reference character 100B represents a vehicle surface force sensor, according to this embodiment. The sensor 100B is used, applied to, and works on a vehicle 10 having an outer surface 12. The outer surface 12 has sheet metal body panels and vehicle paint applied to the sheet metal body panels.

The vehicle surface force sensor 100B is a capacitive element, sometimes referred to as a capacitive structure, associated with the outer surface 12. The capacitive structure 100B is defined by a three-layer stack having a first conductive layer 102B, a dielectric layer 104B, and a second conductive layer 106B. The first conductive layer 102B is the vehicle's sheet metal body panels. Each of the body panels 102B has a first side 102B1 and a second side 102B2. The dielectric layer 104B has a first side 104B1 and a second side 104B2. The dielectric layer 104B is the vehicle paint that is bonded to the sheet metal body panels 102B.

In this embodiment, it is evident that only one structural layer is applied to the vehicle 10. The first side 106B1 of the second conductive layer 106B is adhered to the second side 104B2 of the dielectric layer 104B, i.e. the vehicle paint, of the vehicle 10. In this embodiment, the outer surface 12 is sheet metal or aluminum body panels and vehicle paint. More eloquently, the body panels are the first conductive layer 102B and the vehicle paint is the dielectric layer 104B. Thus, in this embodiment, the only layer actually applied to the vehicle 10 is the application of the second conductive layer 106B, which is a thin film conductive layer, adhered to the second side 104B2 of the dielectric layer 104B (the vehicle paint).

Generally Applicable to all Embodiments

The capacitance structures 100/100A/100B are flexible, deformable transparent films and are applied as thin films, generically shown by reference character 20 in FIG. 1A. When applied as three-layers (FIG. 2), the entire capacitive structure 106B is transparent. When applied as a single layer (FIG. 3), i.e. applying the second conductive layer 106B on top of the vehicle paint 104B, the second conductive layer is transparent.

The layers comprising the thin films are substantially-flat. A capacitance meter, sometimes generically referred to as a meter, is shown as reference character 410 in FIGS. 2, 3, and 4 is representative for all embodiments. The meter 410 is not shown in FIGS. 1A and 1B to assure ease of viewing other structural features.

The capacitance meter 410 can be a multimeter or multi-element capacitors monitoring circuit, that resided in or on the vehicle 10 being monitored, to operate with the vehicle and is electrically-coupled with the first conductive layer (102, 102A, and 102B) and the second conductive layer (106, 106A, and 106B). The capacitance meter 410 determines the capacitance of the capacitance structure (100, 100A, and 100B), i.e. the vehicle surface force sensor, by measuring the capacitance between the first and second conductive layers 102/102A/102B and 106/106A/106B as a force is applied, and sometimes released, to the second side 106A2/106B2 of the second conductive layer 106A/106B.

The capacitance structures (100, 100A, and 100B) are powered by the vehicle's internal power system and can be individually addressed sensors that are wired, much like a printed circuit board in the thin film application 20, with the wires being electrically connected the capacitance meter 410. In this scenario, the capacitance meter 410 then functions as a central capacitance meter in communication with the vehicle's computer or a separate computer, such as a user's laptop computer or computer tablet. Thus, the capacitance meter 410 is generically shown for ease of viewing and should not be construed as the only measurement configuration. Force application is shown generically in the working example illustrated in FIG. 4.

The conductive layers (102/102A/102B and 106/106A/106B) thicknesses are greater than 100 nm. The dielectric layer (104/104A/104B) thickness is a range of about 50 nm to about 1 mm. The effective area of the capacitive structure 100 is the area of the underlying structure (the vehicle surface 12) covered by the functional region of the capacitive structure and the space between the structures. The functional region of the capacitive structure 100 is the effective area of individual capacitive structures covering the vehicle 10 is variable based on the vehicle size, desired location resolution, and budgeted system complexity. The capacitive structures 100 effective area can span areas of 1 mm$^2$ to 100 m$^2$. Each single capacitive structure 100A comprises an individual sensor in a sensor array when distributed over the vehicle surface 12 with other individual sensor elements.

The capacitive element 100/100A/100B is configured to change capacitance as a function of both a compressive force applied to the second conductive layer 106A/106B, as well as a tensile force to the second conductive layer 106A/106B. In the embodiments, the first conductive layer 102/102A/102B is selected from the group of conductors consisting of conductive transparent oxide, conductive polymers, metal, conductive metal oxide, metal, conductive metal nitride, doped semiconductors, indium tin oxide, metal grid, doped zinc oxide, fluorine doped tin oxide, and conductive low dimensional carbon films such as carbon nanotubes and graphene. For the embodiment shown in FIG. 3, the first conductive layer 102B the vehicle's body panels, normally considered to be sheet steel, titanium, or aluminum.

The dielectric layer 104/104A/104B, is a deformable insulator selected from the group of insulators consisting of insulating polymers, semiconductors, insulating metal oxide, insulating metal nitride, adhesive, and paint. In some embodiments, the dielectric layer 104/104A/104B can be at least one or a plurality of thin film structures. In the embodiment in FIG. 3, the dielectric layer 102B is vehicle paint, protective coating, clear coat, or a combination of these. The second conductive layer 106/106A/106B is selected from the group of conductors consisting of conductive transparent oxide, conductive polymer, metal, conductive metal oxide, conductive metal nitride, and doped semiconductors.

Theory of Operation and Working Example

The disclosed embodiments are different than current vehicular uses that use capacitive coupling using a proximity sensor to alert someone as, for example, a vehicle approaches an object. Typical proximity capacitance sensors having conductive elements lying next to each other in the same plane to maximize field lines that reach out of the sensor plane to interact with objects in proximity to the device. This makes typical proximity capacitance sensors sensitive to objects that are not touching yet and surface defects. The embodiments are focused on the physics after an object actually touches and especially after it attaches, i.e the pushing and pulling on the vehicle surface caused by object attachment. Thus, the capacitive structures 100/100A/100B second conductive layer 106/106A/106B shields the first conductive layer 102/102A/102B such that the field lines within the capacitive structures are concentrated inside the dielectric layer 104/104A/104B.

In the disclosed embodiments, the capacitive structures 100/100A/100B can undergo a physical change as a result of external forces such as striking, attaching, embedding, or removal of the second conductive 106/106A/106B. In layman's terms, the embodiments could be thought of as a force and attachment sensor. The capacitance changes as a function of separation between the conductive layers 102 and 106, 102A and 106A, and 102B and 106B (such as between the transparent conductor and vehicle sheet metal) caused by the dielectric layer 104, 104A, and 104B compressing and expanding in thickness that is induced when an object is attached to the vehicle 10 over the second conductive layer. The embodiments minimize the impact of objects that are closely spaced, but not touching, which is something that strongly influences proximity capacitive sensor arrays.

The capacitance meter 410 can be electrically-connected to and in signal communication with the vehicle's power and computer systems, respectively. Both series or parallel monitoring of the capacitive structures 100/100A/100B with the capacitance meter 410 is valid. The electrical and computer routes and structures are not shown for ease of viewing and because a person having ordinary skill in the art will recognize that vehicle power and computer structures are well-known.

The embodiments shown in FIGS. 1A through 3 and referenced with reference characters 100, 100A, and 100B, can also be referred to as a vehicle surface force sensor that works in conjunction with the vehicle's power and computer systems then alerts users of compressive, shear, or tensile stress generated by a magnetic or chemical adhesion attachment (tape, glue). The alert is continuous as long as the attached object remains attached, in contrast to detection mechanisms that only respond to a changing attachment status. The vehicle surface force sensor 100/100A/100B, which can also be referred to as a wrapper due to thin film application around the vehicle's outer surface 12, can be used as an independent attachment sensor, or as a complement to existing sensing technology.

A working demonstration was fabricated in a solid state laboratory and is shown in a side view in FIG. 4 for ease of viewing additional components, as well as having the understanding that the section views presented earlier are relevant in the FIG. 4 embodiment. Thus, unless stated otherwise with additional specificity, the embodiment shown in FIG. 4 with reference character 400 is similar to the embodiments shown in FIGS. 1A, 1B, 2, and 3, having reference characters 100, 100A, and 100B, respectively.

FIG. 4, therefore, illustrates a working platform, sometimes referred to as a sensor or working sensor, showing the layer-by-layer components used to construct the sensor. Reference character 400 is used for the working embodiment. Adhesion and bonding techniques in the working platform 400 were similar to those previously described.

In FIG. 4, a first conductive layer 402 was a metal sheet, sometimes referred to a metal substrate, to represent a vehicle's sheet metal. A dielectric layer 404 was overlain on top of the metal sheet 402. The dielectric layer 404 was a ten microns thick transparent dielectric polymer known as polydimethylsiloxane (PDMS). A second conductive layer 406 was overlain on top of the PDMS 404. The second conductive layer 406 was a transparent conductive oxide (TCO) and, more specifically, a layer of indium tin oxide (ITO). A glass superstrate 407 is shown as being overlain on top of the ITO 406. However, as explained below, the commercially-available ITO 406 purchased was on only one side of the glass superstrate 407.

The sensor 400 had an effective area of one square inch (1 in$^2$). The sensor 400 used a conductive bridge 408 to create an accessible electrode connection point to the thin ITO material 406 (50 nm thick) in the laboratory demonstration. Small magnets (shown simply as one magnet for ease of viewing and having reference character 420) were applied on top of the glass superstrate 407 and held in place due to magnetic attraction between the magnets and metal substrate 402. The magnets 420 are depicted with a downward arrow and letter "F" to designate a downward force that the magnets exhibit to the second conductive layer 406. The magnets 420 were nickel-plated neodymium and were about one-quarter inch in diameter and about one-eighth inch in thickness, and had a maximum pull of about three pounds. An object attached by magnets 420 would exhibit a fairly constant pushing force (F).

Reference character 422 is included in FIG. 4 as an educational tool to represent an object attached by tape, which would cause an upward tensile force shown by the up arrow and letter "T." An object attached by tape 422 would exhibit a change in capacitance caused by pulling, i.e. the object is attached and then there is a pulling force (a tensile force (T)). An object attached by glue would behave in similar fashion as an object attached by tape.

The physics used in the system can be simplified to the familiar parallel plate capacitor. This yields a capacitance dependence of dielectric thickness that adheres to Equation No. 1:

$$\text{Capacitance, } C = \varepsilon \varepsilon_0 / D, \qquad \text{(Equation 1)}$$

where $\varepsilon$=Dielectric constant ~2.5;
  $\varepsilon_0$=Permittivity of Free Space=$8.854 \times 10^{-12}$;
  A=Area=1 inch×1 inch=$6.45 \times 10^{-4}$ m$^2$; and
  D=Distance=polymer thickness ~$1.0 \times 10^{-5}$ m.

Using the above assumptions, the predicted capacitance of the device 400 without any load would be $1.4 \times 10^{-11}$ F=14 pF. As the separation distance between the plates (the two conductive layers 402 and 406) decreases with force, the capacitance will increase.

When the device was examined without any load (without the magnets 420), the capacitance was 3.3 pF. The discrepancy between the measured and predicted capacitance was attributed to the uncertainty in the polymer layer thickness (the dielectric layer 404). The dielectric layer 404 thickness (i.e. distance) in the proof of concept demonstration was not well known because the polymer was applied using the squeegee method, known by one having ordinary skill in the art as a relatively fast and simple polymer processing method.

An attachment was simulated by putting the magnets 420 on top of the glass superstrate 407, which is on the top surface of the TCO 406, The glass superstrate 407 was used because the commercially-available ITO (the second conductive layer 406) was sold on a glass superstrate. The glass superstrate 407 is coated on one side with the ITO 406, hence the need to use the conductive bridge 408 to make an electrical connection for the working platform 400.

The compressive force between the magnet 420 and the metal substrate 402 pushed the TCO layer 406 and the substrate closer together, increasing the capacitance when the magnet was present. Applying one magnet 420 increased the capacitance to 51 pF, and two magnets increased the capacitance to 61 pF. As predicted, the addition of compressive force from the magnet 420 increased the capacitance.

The system would be expected to respond to a tensile force or shear force as well, increasing the distance D and therefore decreasing the capacitance in Equation No. 1. Although tensile and shear were not examined experimentally in the preliminary proof of concept, there is an important takeaway from the working example. Namely, the predicted opposing capacitance change from compressive and tensile forces should allow for attachment awareness and indication of the type of attachment as predicted from the well-known capacitance relationship shown in Equation No. 1.

While the embodiments have been described, disclosed, illustrated and shown in various terms of certain embodiments or modifications which it has presumed in practice, the scope is not intended to be, nor should it be deemed to be, limited thereby and such other modifications or embodiments as may be suggested by the teachings herein are particularly reserved especially as they fall within the breadth and scope of the claims here appended.

What is claimed is:

1. A vehicle surface force sensor configured to sense when a force is applied to a vehicle's outer surface, comprising:
a vehicle having an outer surface;
a capacitive structure attached to said outer surface, wherein said capacitive structure is defined by a three-layer stack having a first conductive layer, a dielectric layer, and a second conductive layer;
wherein said first conductive layer having a first side and a second side, wherein said dielectric layer having a first side and a second side, wherein said second conductive layer having a first side and a second side;
wherein said first side of said dielectric layer is bonded to said second side of said first conductive layer, wherein said first side of said second conductive layer is bonded to said second side of said dielectric layer;
wherein said first side of said first conductive layer is adhered to said vehicle outer surface; and
the force applied to said second side of said second conductive layer, said force resulting from an object attached to said second side of said second conductive layer, said force causing capacitance changes between said first and second conductive layers.

2. The sensor according to claim 1, further comprising a capacitance meter electrically-coupled between said first conductive layer and said second conductive layer, wherein said capacitance meter configured to determine capacitance of said capacitive structure by measuring said capacitance changes.

3. The sensor according to claim 1, wherein said capacitive structure is a flexible, deformable transparent thin film.

4. The sensor, according to claim 1, wherein said first conductive layer is selected from the group of conductors consisting of conductive transparent oxide, conductive polymers, metal grid, conductive metal oxide, conductive metal nitride, doped semiconductors, metal gird, and conductive low dimensional carbon films.

5. The sensor, according to claim 1, wherein said dielectric layer is an insulator selected from the group of insulators consisting of insulating polymers, semiconductors, insulating metal oxide, insulating metal nitride, adhesive, and paint.

6. The sensor, according to claim 1, wherein said second conductive layer is selected from the group of conductors consisting of conductive transparent oxide, conductive polymer, metal, conductive metal oxide, conductive metal nitride, and doped semiconductors.

7. The sensor according to claim 1, wherein said capacitance changes are a function of said force applied, wherein said force applied is a compressive force or a tensile force.

8. A system configured to sense when a force is applied to a vehicle's outer surface, comprising:
a vehicle having an outer surface;
a plurality of capacitive structures attached to said outer surface, wherein each capacitive structure in said plurality of capacitive structures, comprising:
a three-layer stack having a first conductive layer, a dielectric layer, and a second conductive layer;
wherein said first conductive layer having a first side and a second side, wherein said dielectric layer having a first side and a second side, wherein said second conductive layer having a first side and a second side;
wherein said first side of said dielectric layer is bonded to said second side of said first conductive layer, wherein said first side of said second conductive layer is bonded to said second side of said dielectric layer;
wherein said first side of said first conductive layer is adhered to said vehicle outer surface; and
the force applied to said second side of said second conductive layer, said force resulting from an object attached to said second side of said second conductive layer, said force causing capacitance changes between said first and second conductive layers.

9. The system according to claim 8, further comprising a capacitance meter electrically-connected to each capacitive structure in said plurality of capacitive structures, and electrically-coupled between said first conductive layer and said second conductive layer, wherein said capacitance meter is configured to measure capacitance of each capacitive structure in said plurality of capacitive structures by measuring said capacitance changes.

10. The system according to claim 9, wherein said plurality of capacitive structures forming a sensor array applied to and distributed over said outer surface of said vehicle as a flexible, transparent thin film.

11. The system according to claim 9, wherein each capacitive structure in said plurality of capacitive structures is configured to measure capacitance between said first and second conductive layers.

12. The system according to claim 9, wherein each capacitive structure in said plurality of capacitive structures is a flexible, transparent thin film.

13. The system, according to claim 8, wherein said first conductive layer is selected from the group of conductors consisting of conductive transparent oxide, conductive polymers, metal, conductive metal oxide, metal grid, conductive metal nitride, doped semiconductors, indium tin oxide, metal gird, doped zinc oxide, carbon nanotubes, and fluorine doped tin oxide.

14. The system, according to claim 8, wherein said dielectric layer is an insulator selected from the group of insulators consisting of insulating polymers, semiconductors, insulating metal oxide, insulating metal nitride, adhesive, and paint.

15. The system, according to claim 8, wherein said second conductive layer is selected from the group of conductors consisting of conductive transparent oxide, conductive polymer, metal, conductive metal oxide, conductive metal nitride, and doped semiconductors.

16. The system according to claim 8, wherein said capacitance changes are a function of said force applied, wherein said force applied is a compressive force or a tensile force.

17. A vehicle surface force sensor configured to sense when a force is applied to a vehicle's outer surface, comprising:
  a vehicle having an outer surface comprising sheet metal body panels and vehicle paint on said sheet metal body panels;
  a capacitive structure associated with said outer surface, wherein said capacitive structure is defined by a three-layer stack having a first conductive layer, a dielectric layer, and a second conductive layer;
  wherein said first conductive layer is said sheet metal body panels, each of said panels having a first side and a second side, wherein said dielectric layer having a first side and a second side, wherein said second conductive layer having a first side and a second side;
  wherein said first side of said dielectric layer is bonded to said second side of said first conductive layer, wherein said first side of said second conductive layer is adhered to said second side of said dielectric layer, wherein said dielectric layer is said vehicle paint applied to said second side of said sheet metal body panels;
  the force applied to said second side of said second conductive layer, said force resulting from an object attached to said second side of said second conductive layer, said force causing capacitance changes between said first and second conductive layers.

18. The sensor according to claim 17, further comprising a capacitance meter electrically-coupled between said first conductive layer and said second conductive layer, wherein said capacitance meter configured to determine capacitance of said capacitive structure by measuring said capacitance changes.

19. The sensor according to claim 14, wherein said second conductive layer is selected from the group of conductors consisting of conductive transparent oxide, conductive polymer, metal, conductive metal oxide, conductive metal nitride, and doped semiconductors.

20. The sensor according to claim 17, wherein said capacitance changes are a function of said force applied, wherein said force applied is a compressive force or a tensile force.

* * * * *